United States Patent [19]

Mossey

[11] Patent Number: 4,770,544
[45] Date of Patent: Sep. 13, 1988

[54] TEMPERATURE SENSOR

[75] Inventor: Paul W. Mossey, Greenhills, Ohio

[73] Assignee: General Electric Company, Cincinnati, Ohio

[21] Appl. No.: 52,119

[22] Filed: May 8, 1987

Related U.S. Application Data

[63] Continuation of Ser. No. 798,154, Nov. 15, 1985, abandoned, which is a continuation-in-part of Ser. No. 644,472, Aug. 27, 1984, abandoned.

[51] Int. Cl.⁴ ............................ G01K 1/14; G01J 5/08
[52] U.S. Cl. .................................... 374/144; 374/130; 374/131
[58] Field of Search ............... 374/121, 127, 129, 130, 374/131, 141, 135, 144, 145, 159, 161; 356/43, 44, 45; 250/368, 227; 350/96.33

[56] References Cited

U.S. PATENT DOCUMENTS

| Re. 31,832 | 12/1985 | Samulski | 374/131 |
|---|---|---|---|
| 1,125,233 | 1/1915 | Whipple | 374/130 |
| 3,051,035 | 8/1962 | Root | 374/131 |
| 3,105,150 | 9/1963 | Duke | 374/131 |
| 3,583,786 | 6/1971 | Marcatilli | 350/96.33 |
| 3,596,518 | 8/1971 | Kirkpatrick | 374/135 |
| 3,623,368 | 11/1971 | Decker, Jr. | 374/131 |
| 3,626,758 | 12/1971 | Stewart et al. | 374/129 |
| 3,745,816 | 7/1973 | Erickson | 374/159 |
| 4,047,379 | 9/1977 | Brooks et al. | 374/144 |
| 4,139,262 | 2/1979 | Mahlein et al. | 350/96.33 |
| 4,187,434 | 2/1980 | Pater, Jr. et al. | 374/135 |
| 4,243,298 | 1/1981 | Kao et al. | 350/96.33 |
| 4,313,344 | 2/1982 | Brogardh et al. | 374/129 |
| 4,390,343 | 6/1983 | Walter | 427/2 |
| 4,418,984 | 12/1983 | Wysocki et al. | 350/96.33 |
| 4,444,516 | 4/1984 | Dostoomian et al. | 374/131 |
| 4,525,080 | 6/1985 | Smith | 374/121 |
| 4,542,987 | 9/1985 | Hirschfeld | 374/131 |
| 4,576,486 | 3/1986 | Dils | 374/129 |

FOREIGN PATENT DOCUMENTS

| 426631 | 7/1911 | France | 374/121 |
|---|---|---|---|
| 2045921 | 11/1980 | United Kingdom | 374/131 |

OTHER PUBLICATIONS

U.S. Dept. of Commerce News Release, 9/21/82.
R. R. Dils, High Temperature Optical Fiber Thermometer, *Journal of Applied Physics*, vol. 54, No. 3, Mar. 1983, pp. 1198-1201.

Primary Examiner—William A. Cuchlinski, Jr.
Assistant Examiner—Thomas B. Will
Attorney, Agent, or Firm—Derek P. Lawrence; Nathan D. Herkamp

[57] ABSTRACT

In one form of the present invention, an emissive substance radiates electromagnetic radiation as a function of temperature. The radiation is transmitted by a waveguide to a sensor which measures the intensity of the radiation and infers the temperature of the emissive substance therefrom.

7 Claims, 2 Drawing Sheets

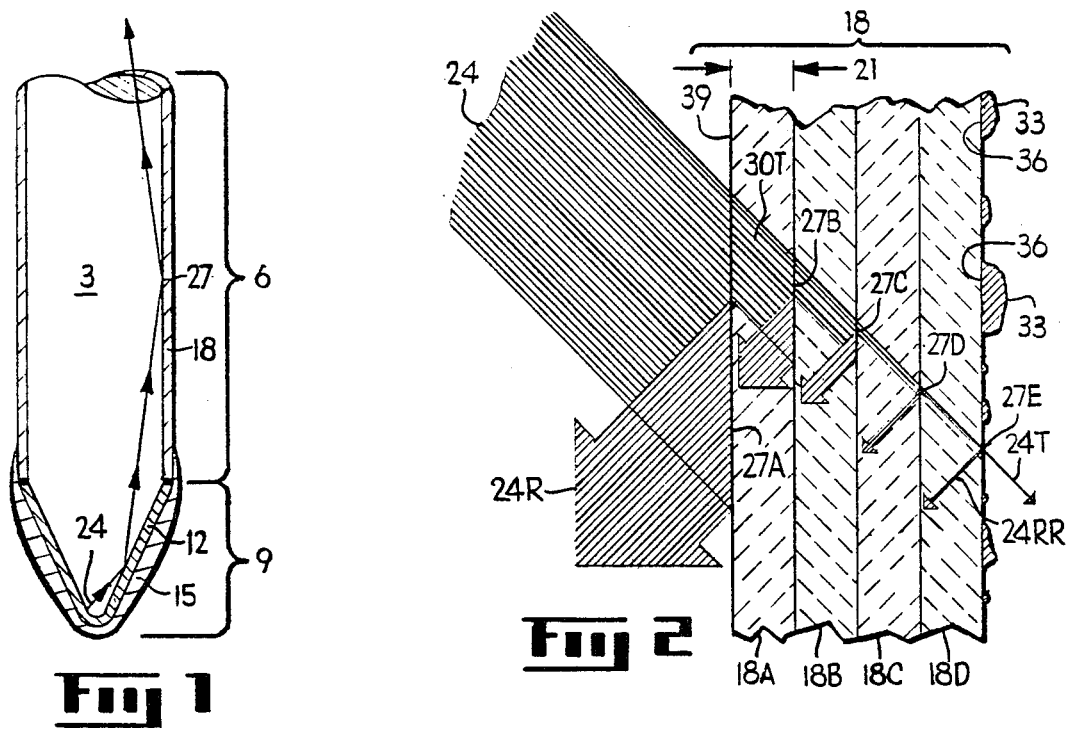
Fig 1
Fig 2
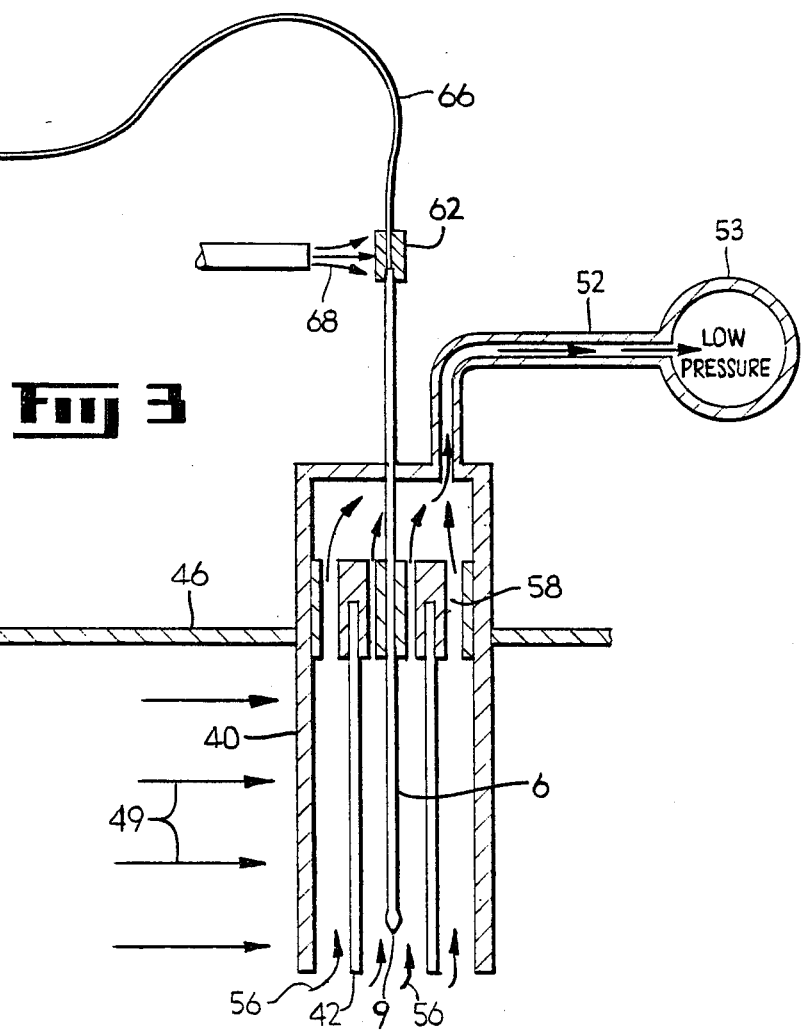
Fig 3

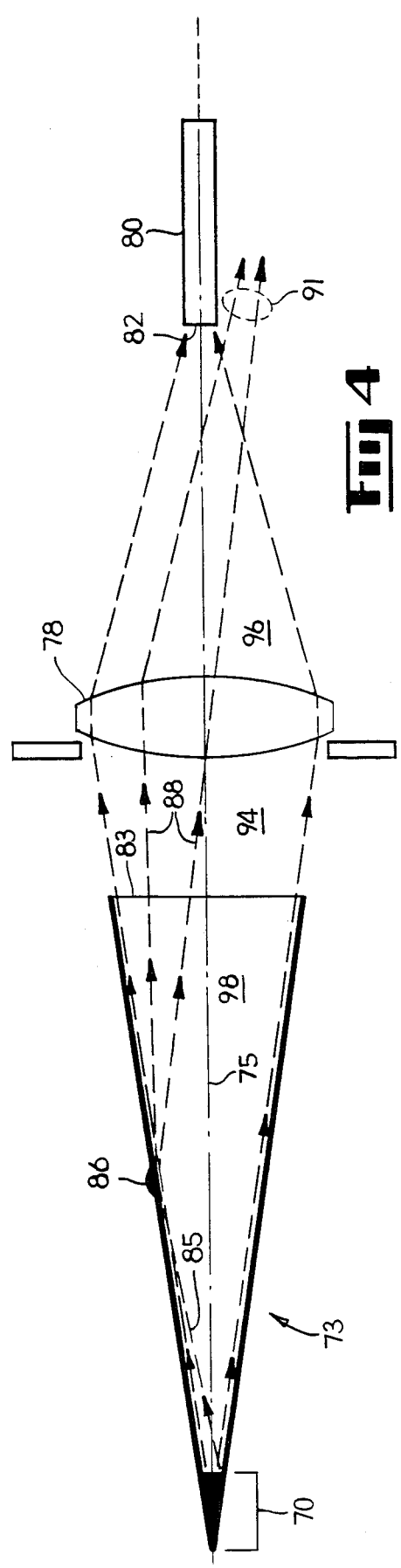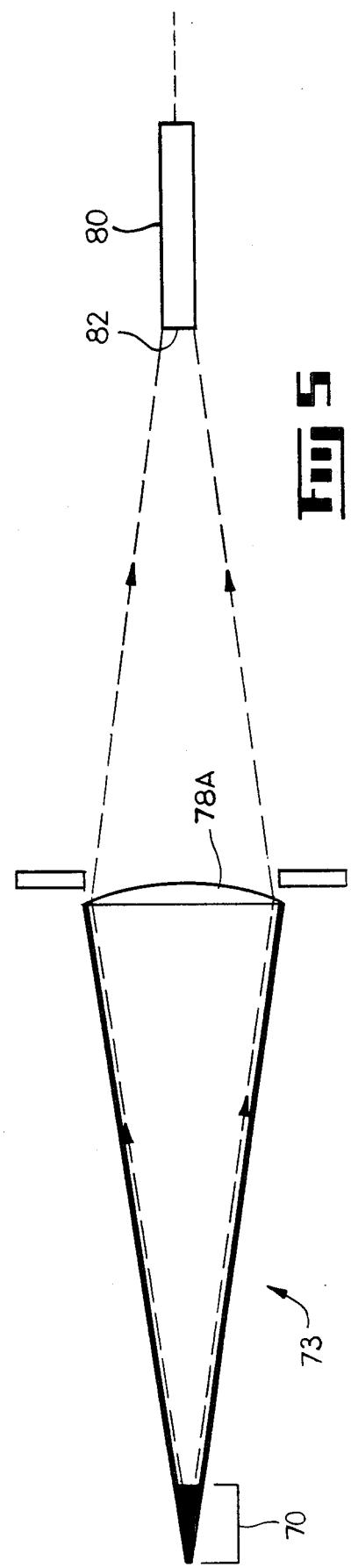

TEMPERATURE SENSOR

This is a continuation of application Ser. No. 798,154, filed Nov. 15, 1985, now abandoned, which is a continuation-in-part of application Ser. No. 644,472, filed Aug. 27, 1984, now abandoned.

The present invention relates to temperature sensors and, more specifically, to sensors for use in a hostile environment.

BACKGROUND OF THE INVENTION

It is desirable to be able to sense the temperature of a gas in an environment subject to vibration, high temperature, dirt, and other factors which are generally abusive to scientific instruments. A gas turbine engine contains such an environment in which temperature sensing is important.

OBJECTS OF THE INVENTION

It is an object of the present invention to provide a new and improved temperature sensor.

It is a further object of the present invention to provide a new and improved temperature sensor which is rugged enough to withstand the abuse inflicted by a hostile environment such as that contained in a gas turbine engine.

SUMMARY OF THE INVENTION

In one form of the present invention, an emissive substance radiates electromagnetic radiation as a function of temperature. The radiation is transmitted by a waveguide to a sensor which measures the intensity of the radiation and infers the temperature of the emissive substance therefrom.

BRIEF DESCRIPTION OF THE DRAWINGS

FIGS. 1, 4 and 5 illustrate three forms of the present invention.

FIG. 2 illustrates a multi-layer reflective coating surrounding the waveguide region 6 in FIG. 1.

FIG. 3 illustrates the invention of FIG. 1 installed in a gas turbine engine (details of the engine are not shown).

DETAILED DESCRIPTION OF THE INVENTION

FIG. 1 illustrates one form of the present invention, wherein a single crystal sapphire rod 3 is shown. The sapphire rod 3 is divided into a waveguide region 6 and a cavity region 9. The cavity region 9 is generally conical and is coated with a substance having a high emissivity, such as sputtered iridium. The iridium coating 12 is in turn covered by a protective coating 15, such as sputtered alumina.

The waveguide region 6 is coated with a multi-layer reflective coating 18 as shown in FIG. 2. The coating 18 contains alternating layers of materials with high- and low indices of refraction. For example, layer 18A is that adjacent to the waveguide region 6 in FIG. 1 and is constructed of the same material as layer 18C in FIG. 2, which is preferably titanium dioxide. Layers 18B and 18D are constructed of the same material, which is preferably zirconium dioxide. The layers 18A–D are preferably of uniform thickness (dimension 21) and the thickness is equal to ½ the wave length of the principal frequency produced by the iridium coating 12 in FIG. 1.

The embodiment of FIG. 1 operates as follows. The iridium coating 12 tends to attain the temperature of the medium surrounding it and the iridium, being a highly emissive substance, will radiate electromagnetic radiation in the infrared region indicated by ray 24. The intensity of the radiation is a function of the temperature of the iridium. The cavity region 9, in being conical, displays a greater surface area of iridium to the waveguide region 6 than if the rod were cut at a right angle (thus eliminating the cavity region) and the circular cut end were coated with iridium.

Viewed another way, the cavity region 9 exhibits some of the characteristics of a black body cavity radiator, thus providing a highly directional and efficient source of radiation as a function of the temperature of the iridium coating 12.

As the ray 24 travels along the waveguide region 6, it is internally reflected at the interface between the sapphire rod 3 and the multi-layer coating 18, as at point 27. This reflection is further illustrated in FIG. 2. As therein shown, the successive reflections at interfaces 27A–E return large fractions such as reflected ray 24R of the ray 24 back into the sapphire rod 3. Only a small part of the ray 24, as shown by transmitted ray 24T, is lost, as compared with the relatively larger transmitted ray 30T which would have been lost in the absence of the multi-layed coating 18.

In addition to providing enhanced internal reflection, the multi-layered coating serves another purpose. If the sensor in FIG. 1 is to be used in a gas turbine engine, there is a strong likelihood that foreign matter and soot particles 33 in FIG. 2 will become deposited upon the waveguide region 6 in FIG. 1. The soot particles 33 will alter the reflection co-efficient at the surfaces upon which they lodge, namely at interfaces 36 in FIG. 2.

If the reflective coating 18 were absent so that the dirt particles lodged directly on the outer surface of the waveguide region 6 (at point 39), the reflected ray 24R would be significantly altered. However, since the alteration occurs at an interface (at layer 18D) where the reflected ray 24RR is relatively much smaller than reflected ray 24R, the net effect of the soot 33 on the transmission of ray 24 on FIG. 1 through the waveguide region 6 is much lessened. In one sense, the separation of the surface upon which the soot 33 collects from the surface of the waveguide 6 by the coating 18 (which acts as a barrier) serves to prevent the soot 33 from significantly affecting the internal reflection within the waveguide 6. Therefore, the accumulation of soot particles 33 upon the waveguide region 6 has a diminished effect upon the intensity of the radiation transmitted by the waveguide region 6.

This relative immunity of the attenuation of the waveguide region 6 to the accumulation of the soot 33 on its outer surface is highly significant because the attenuation of ray 24 must stay relatively constant over time in order to obtain accurate temperature measurement based on the emissivity of the iridium coating 12 in FIG. 1. For example, if a silicon diode detector (not shown) responsive in the near infrared range is used, and if the temperature of the cavity region 9 is 2000° F., a drop in the energy transmitted by the waveguide region 6 of 10% would result in an error of approximately 20° in the temperature indicated by the diode detector.

FIG. 3 illustrates the cavity region 9 and the waveguide region 6 installed in a gas turbine engine (not shown). The cavity region 9 and the waveguide region are surrounded by concentric protective cylinders 40 and 42 which are supported by a wall 46 of the engine, preferably downstream of the combustor (not shown), and penetrate into a high velocity, hot gas stream indicated by arrows 49. A vent tube 52 is connected to a lower pressure region 53 than the gas stream 49 so that gas jets 56 are channeled onto the cavity region 9, through passages 58, and vented to the low pressure region. The waveguide region 6 extends to an optical coupler 62 which connects the waveguide region to an optical bundle 66. A cooling jet 68, which is available as known in the art from various bleeds on the engine, cools the optical coupler 62, because the temperatue of the waveguide 6 may be high enough to damage the optical bundle 66.

The optical bundle 66 leads to measuring equipment 72, known in the art, which measures temperature, such as the 1777° F. shown, based on the intensity of the radiation transmitted through the optical bundle 66.

An invention has been described for use in a gas turbine engine for measuring the temperature of a hot, soot-bearing gas stream. Numerous modifications can be undertaken without departing from the true spirit and scope of the present invention. For example, the protective cylinders 40 and 42 in FIG. 3 may not be necessary in some situations.

Two alternative forms of the invention are shown in FIGS. 4 and 5. In FIG. 4, the emissive material is confined to the tip (or apex) 70 of a conical sensor 73. The sensor 73 is preferably a right circular cone having a central axis 75. A lens 78 has an axis which is coincident with the axis 75. A fiberoptic cable 80 analogous to cable 66 in FIG. 3 has a face 82 perpendicular to the axis 75, and positioned near the base 83 of the cone.

With the structure as just described, only radiation emanating from the tip 70 will be focused by lens 78 onto the face 82. That is, for example, ray 85 which strikes a foreign deposit 86 and is reflected as rays 88 will be focused to region 91 instead of to face 82, as a geometric optic construction will readily show. Therefore, the problems of debris accumulation discussed above in connection with FIG. 2 are greatly reduced since air is the transmission medium in regions 94 and 96. Further, if the conical sensor is hollow, then air is likewise the transmission medium in region 98.

A third embodiment is shown in FIG. 5. As in FIG. 4, the emissive material is confined to tip 70. However, the conical sensor 73 is not hollow, but is solid, preferably constructed of sapphire. Further, the base of the cone is ground into a lens 78A which serves the function of lens 78 in FIG. 4.

What is desired to be secured by Letters Patent is the invention as defined in the following claims.

I claim:

1. A temperature sensor, comprising:
   an optical waveguide having a generally conical end;
   an electromagnetic radiation emissive coating on the conical end; and
   a multilayer dielectric coating on substantially the entire waveguide for increasing the internal reflectance of the waveguide and providing a barrier which reduces the alteration in the internal reflectance of the waveguide caused by foreign matter contacting the waveguide.

2. A temperature sensor as in claim 1, in which the waveguide penetrates a wall of a gas turbine engine and extends into a hot gas stream, the temperature sensor further comprising:
   a means for channeling a portion of the hot gas stream onto the conical end of the waveguide, comprising:
      protecting means attached to the wall of the engine, penetrating into the hot gas stream, and surrounding the optical waveguide; and
      vent means connecting the protecting means to a region of lower pressure than that of the gas stream.

3. A temperature sensor as in claim 2, further comprising:
   (e) an optical bundle,
   (f) an optical coupler connecting the waveguide to the optical bundle,
   (g) means for supplying a cooling jet to the optical coupler, and
   (h) measuring means connected to the optical bundle for receiving infrared radiation emitted by the emissive coating and deriving the temperature of the emissive coating in response.

4. A temperature sensor as in claim 1, wherein each layer of said multi-layer dielectric coating has a thickness equal to one-half the wavelength of the principal frequency produced by the emissive coating.

5. A temperature sensor as in claim 1, wherein said multi-layer dielectric coating contains alternating layers of titanium dioxide and zirconium dioxide.

6. A temperature sensor, comprising:
   a cone having an apex, a base, and a frustum between the apex and the base;
   an emissive material confined to the apex of the cone;
   a waveguide having a receiving face positioned near the base of the cone; and
   a means for focusing radiation emitted by the emissive material, in which radiation received directly from the emissive material by the focusing means is focused onto the receiving face of the waveguide and radiation from the emissive material reflected by the frustum of the cone prior to receipt by the focusing means is focused to a region remote from the receiving face of the waveguide.

7. The temperature sensor of claim 6, in which the cone is substantially solid and the means for focusing comprises the base of the cone formed into the shape of a lens.

* * * * *